(12) United States Patent
Katayama

(10) Patent No.: US 10,273,890 B2
(45) Date of Patent: Apr. 30, 2019

(54) INTERNAL COMBUSTION ENGINE

(71) Applicant: Toyota Jidosha Kabushiki Kaisha, Toyota-shi, Aichi-ken (JP)

(72) Inventor: Masaaki Katayama, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/964,885

(22) Filed: Apr. 27, 2018

(65) Prior Publication Data
US 2018/0313278 A1    Nov. 1, 2018

(30) Foreign Application Priority Data

Apr. 28, 2017    (JP) ................... 2017-090135

(51) Int. Cl.
| F02B 31/08 | (2006.01) |
| F02D 41/00 | (2006.01) |
| F02D 41/10 | (2006.01) |
| F02B 23/06 | (2006.01) |
| F02B 31/00 | (2006.01) |
| F02M 26/05 | (2016.01) |

(52) U.S. Cl.
CPC ...... F02D 41/0002 (2013.01); F02B 23/0624 (2013.01); F02B 31/085 (2013.01); F02D 41/10 (2013.01); F02B 2031/006 (2013.01); F02D 2041/0015 (2013.01); F02D 2200/04 (2013.01); F02D 2200/0414 (2013.01); F02M 26/05 (2016.02); Y02T 10/146 (2013.01)

(58) Field of Classification Search
CPC ...... F02B 31/08; F02B 31/082; F02B 31/085; F02B 2031/006; F02D 2041/0015; F02D 2200/04; F02D 2200/0404

USPC ............... 123/308, 320, 432, 493, 681, 682
See application file for complete search history.

(56) References Cited

U.S. PATENT DOCUMENTS

| 4,592,315 A | * | 6/1986 | Kobayashi | ............... F02D 37/02 |
| | | | | 123/188.8 |
| 4,598,678 A | * | 7/1986 | Kobayashi | ............... F02B 31/08 |
| | | | | 123/188.14 |
| 5,056,491 A | * | 10/1991 | Tsukamoto | ........... F02D 41/045 |
| | | | | 123/308 |
| 5,267,543 A | * | 12/1993 | Novak | ..................... F02B 31/08 |
| | | | | 123/184.52 |
| 5,960,769 A | * | 10/1999 | Mashiki | ................ F02B 23/104 |
| | | | | 123/295 |
| 6,006,718 A | * | 12/1999 | Ishihara | ................ F02B 31/085 |
| | | | | 123/295 |
| 6,161,519 A | | 12/2000 | Kimura et al. | |

(Continued)

FOREIGN PATENT DOCUMENTS

| JP | H5340258 A | 12/1993 |
| JP | H11315739 A | 11/1999 |
| JP | 2014-125889 A | 7/2014 |

*Primary Examiner* — Erick R Solis
(74) *Attorney, Agent, or Firm* — Dinsmore & Shohl LLP

(57) ABSTRACT

The internal combustion engine comprises a swirl control valve able to change a strength of a swirl generated in a combustion chamber; a load sensor for detecting an engine load; and a control device for controlling the swirl control valve. The control device controls the swirl control valve, when the engine load detected by the load sensor is lower than a predetermined load, so that the swirl ratio is higher when a suction intake gas amount is increasing, compared to when it is decreasing.

6 Claims, 10 Drawing Sheets

| ENGINE LOAD | SUCTION INTAKE GAS AMOUNT | SWIRL RATIO |
|---|---|---|
| LOW LOAD TO MEDIUM LOAD | SMALLER THAN OPTIMUM VALUE | HIGHER THAN STEADY STATE TARGET VALUE |
| | GREATER THAN OPTIMUM VALUE | LOWER THAN STEADY STATE TARGET VALUE |
| MEDIUM LOAD TO HIGH LOAD | SMALLER THAN OPTIMUM VALUE | LOWER THAN STEADY STATE TARGET VALUE |
| | GREATER THAN OPTIMUM VALUE | HIGHER THAN STEADY STATE TARGET VALUE |

(56) References Cited

U.S. PATENT DOCUMENTS

| | | | |
|---|---|---|---|
| 7,404,392 B2* | 7/2008 | Weiss | F02B 29/02 123/442 |
| 2013/0160739 A1* | 6/2013 | Suzuki | F02P 5/1502 123/406.29 |

* cited by examiner

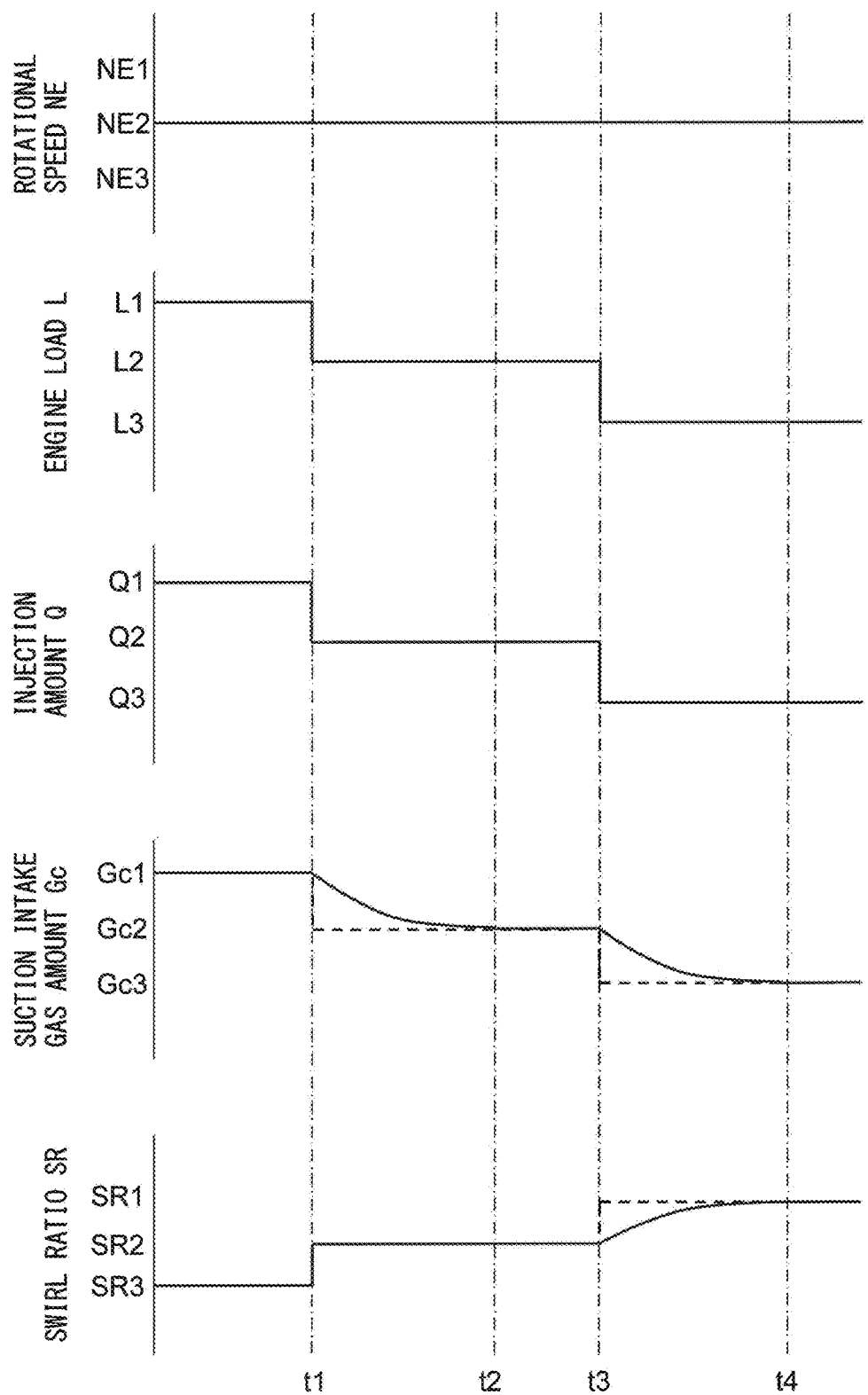

FIG. 10

| ENGINE LOAD | SUCTION INTAKE GAS AMOUNT | SWIRL RATIO |
|---|---|---|
| LOW LOAD TO MEDIUM LOAD | SMALLER THAN OPTIMUM VALUE | HIGHER THAN STEADY STATE TARGET VALUE |
| | GREATER THAN OPTIMUM VALUE | LOWER THAN STEADY STATE TARGET VALUE |
| MEDIUM LOAD TO HIGH LOAD | SMALLER THAN OPTIMUM VALUE | LOWER THAN STEADY STATE TARGET VALUE |
| | GREATER THAN OPTIMUM VALUE | HIGHER THAN STEADY STATE TARGET VALUE |

INTERNAL COMBUSTION ENGINE

CROSS-REFERENCE TO RELATED APPLICATIONS

This application claims priority to Japanese Patent Application No. 2017-090135 filed Apr. 28, 2017, which is incorporated herein by reference in its entirety including the specifications, drawings, and abstract.

TECHNICAL FIELD

The present disclosure relates to an internal combustion engine.

BACKGROUND ART

It has been known in the past to provide one passage among two passages communicating with a combustion chamber of an internal combustion engine with a swirl control valve opening and closing the passage, and to control the opening and closing of this swirl control valve so as to change a strength of a swirl flow generated in the combustion chamber. In general, in an internal combustion engine, if the engine speed is low, the amount of flow of intake gas is small and therefore fuel and air are harder to mix. Accordingly, it is known to close the swirl control valve to generate a strong swirl flow in the combustion chamber, when the engine speed is low (for example, PLT 1).

In addition, even when the engine speed is low, when the load of the internal combustion engine (below, referred to as the "engine load") is high, if closing the swirl control valve to generate a strong swirl flow in the combustion chamber, the "over swirl" is generated and thus cooling loss is increased. Therefore, it is proposed to open the swirl control valve when the engine load is high to suppress the swirl flow generated in the combustion chamber and thereby suppress an increase in the cooling loss (for example, PLT 1).

CITATION LIST

Patent Literature

PLT 1: Japanese Patent Publication No. 5-3410258A

SUMMARY

Technical Problem

In a compression ignition type of internal combustion engine (diesel engine), the amount of fuel injection from a fuel injector and the amount of supply of intake gas into a combustion chamber (suction intake gas amount) are controlled in accordance with the engine load. The fuel injection amount is set to an amount corresponding to the engine load. The higher the engine load, the more the fuel injection amount is increased. Further, the suction intake gas amount is set so that the emission of exhaust gas exhausted from the combustion chamber is lower when injecting fuel of a fuel injection amount corresponding to the engine load from the fuel injector. This suction intake gas amount is also increased as the engine load is higher.

In this regard, when a driver presses on an accelerator pedal and the engine load changes so as to be higher, the fuel injection amount from a fuel injector is immediately changed so as to become a fuel injection amount corresponding to the changed engine load. On the other hand, it takes a certain extent of time for the suction intake gas amount to reach an amount corresponding to the changed engine load after the engine load changes. As a result, during transient operation of the internal combustion engine after the engine load changes, despite the fuel injection amount becoming a suitable value corresponding to the engine load, the suction intake gas amount does not become a suitable value corresponding to the engine load.

When the internal combustion engine is engaged in a transient operation this way, controlling the strength of the swirl flow in the same way as when the internal combustion engine is in the middle of steady operation, sometimes is not necessarily suitable from the viewpoint of a heat efficiency of the internal combustion engine.

The present disclosure was made in consideration of the above problem and has as its object to suitably control a strength of a swirl flow even in a transient operation of an internal combustion engine and to raise a heat efficiency of the internal combustion engine.

Solution to Problem

The present disclosure was made so as to solve the above problem and has as its gist the following.

(1) An internal combustion engine comprising: a swirl control valve able to change a strength of a swirl generated in a combustion chamber, a load detection device for detecting an engine load; and a control device for controlling the swirl control valve, wherein the control device is configured to control the swirl control valve, when an engine load detected by the load detection device is lower than a predetermined load, so that a swirl ratio is higher when a suction intake gas amount is increasing, compared with when it is decreasing.

(2) The internal combustion engine according to above (1), wherein, the control device is configured to control the swirl control valve, when the engine load detected by the load detection device is higher than the predetermined load, so that the swirl ratio is lower when the suction intake gas amount is increasing, compared with when it is decreasing.

(3) The internal combustion engine according to above (1) or (2), wherein the control device is configured to set a basic target opening degree of the swirl control valve based on the engine load detected by the load detection device and correct the basic target opening degree when the suction intake gas amount is decreasing, and when the basic target opening degree is corrected along with a decrease of the suction intake gas amount, a correction amount in a direction making the swirl ratio increase is increased when the engine load detected by the load detection device is relatively high, compared with when it is relatively low.

(4) The internal combustion engine according to above (3), wherein the control device is configured to correct the basic target opening degree when the suction intake gas amount is increasing, and when the basic target opening degree is corrected along with an increase of the suction intake gas amount, a correction amount in a direction making the swirl ratio increase is decreased when the engine load detected by the load detection device is relatively high, compared with when it is relatively low.

Advantageous Effect of Present Disclosure

According to the present disclosure, even during a transient operation of an internal combustion engine, a strength of a swirl flow is suitably controlled and, accordingly, a heat efficiency of the internal combustion engine can be raised.

BRIEF DESCRIPTION OF DRAWINGS

FIG. 6 is a time chart showing transitions in rotational speed, etc., when an engine load falls in stages.

FIG. 10 is a view showing a relationship between an engine load and suction intake gas amount, and a set value of a swirl ratio in the present embodiment.

DESCRIPTION OF EMBODIMENTS

Figure 1:
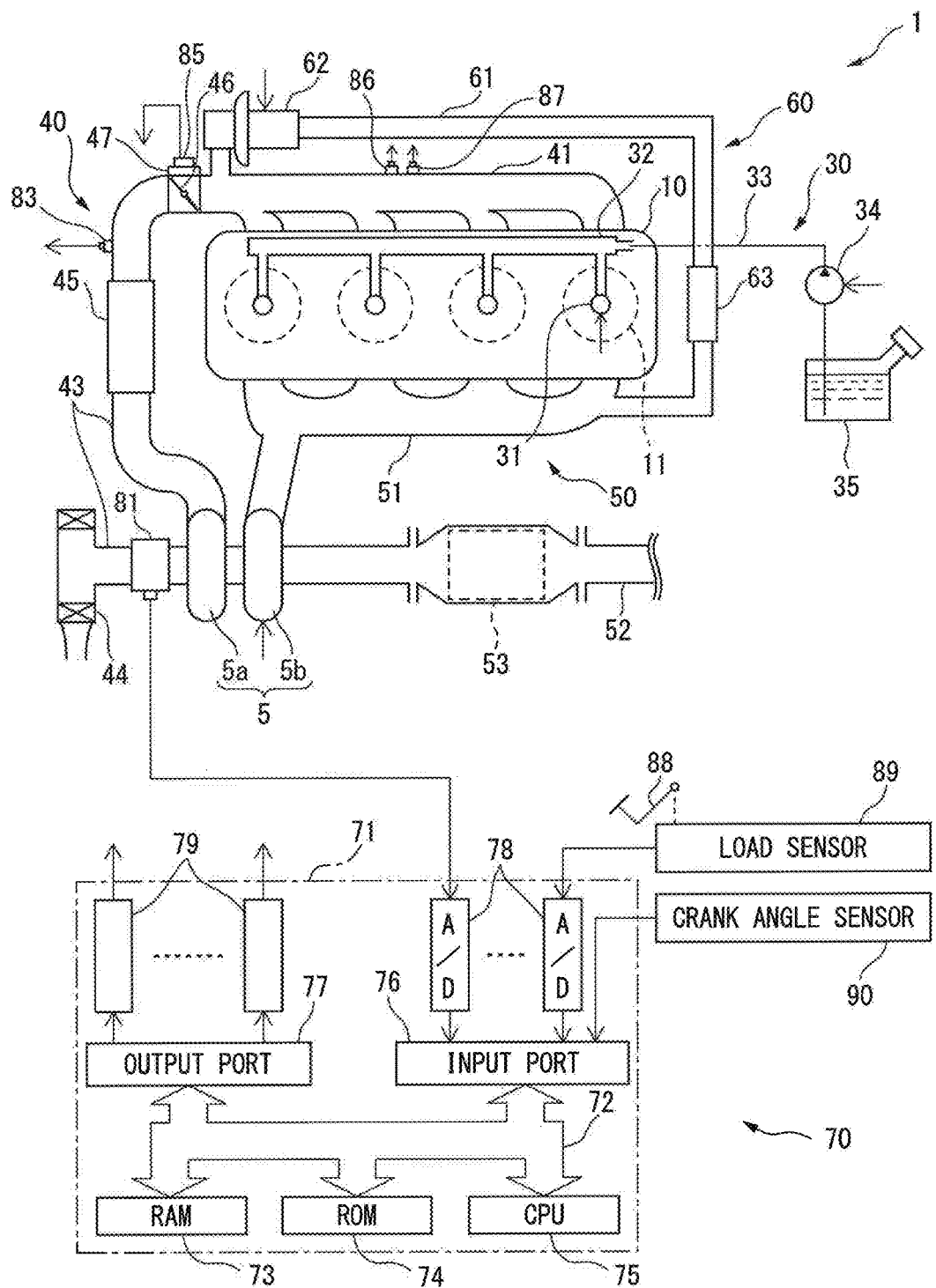
FIG. 1 is a schematic view of the configuration of an internal combustion engine.

Below, referring to the drawings, embodiments of the present disclosure will be explained in detail. Note that, in the following explanation, similar components are assigned the same reference notations.

<Explanation of Internal Combustion Engine as a Whole>

Figure 2:
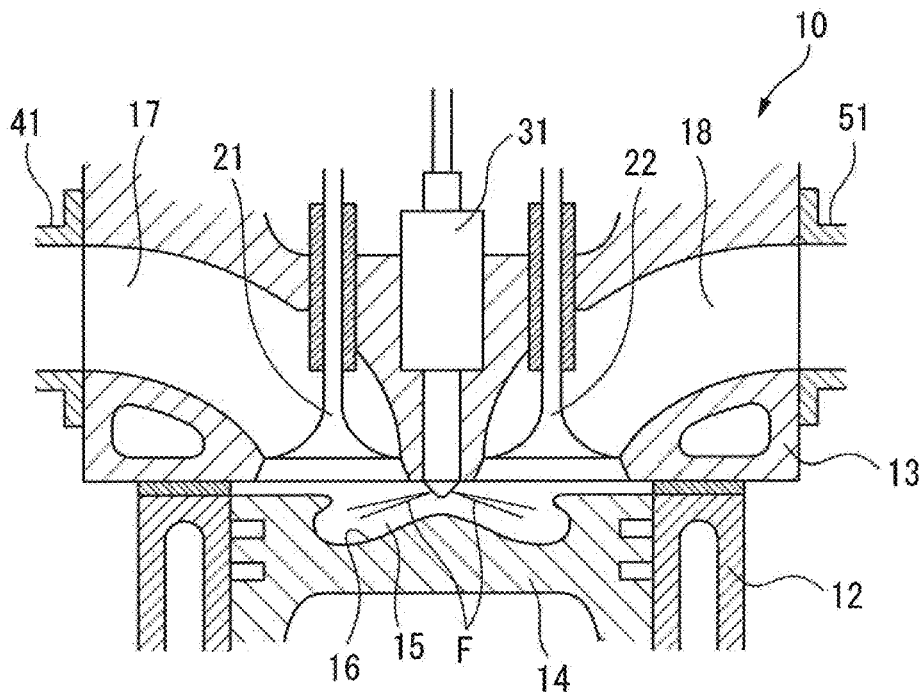
FIG. 2 is a schematic cross-sectional view of an engine body.

First, referring to FIGS. 1 and 2, the configuration of an internal combustion engine 1, in which a control device according to the present embodiment is used, will be explained. FIG. 1 is a schematic view of the configuration of the internal combustion engine 1. FIG. 2 is a schematic cross-sectional view of an engine body 10 of the internal combustion engine 1. The internal combustion engine of the present embodiment uses diesel oil as fuel.

As shown in FIGS. 1 and 2, the internal combustion engine 1 comprises the engine body 10, a fuel feed system 30, an intake system 40, an exhaust system 50, an EGR mechanism 60, and a control device 70.

The engine body 10 comprises a cylinder block 12 at which a plurality of cylinders 11 are formed, and a cylinder head 13. In each cylinder 11, a piston 14 is arranged to be able to reciprocate in the cylinder 11. In each cylinder 11 between the piston 14 and the cylinder head 13, a combustion chamber 15, in which an air-fuel mixture is burned, is formed. At a top surface of the piston 14, a cavity 16 of a recessed shape is formed.

As shown in FIG. 2, in the cylinder head 13, intake ports 17 and exhaust ports 18 are formed. These intake ports 17 and exhaust ports 18 are communicated with the combustion chambers 15 of the cylinders 11. Further, in the cylinder head 13, intake valves 21 opening and closing the intake ports 17 and exhaust valves 22 opening and closing the exhaust ports 18 are arranged.

As shown in FIG. 1, the fuel feed system 30 comprises fuel injectors 31, a common rail 32, fuel feed pipe 33, fuel pump 34, and fuel tank 35. Each fuel injector 31 is arranged in the cylinder head 13 so as to directly inject fuel into the combustion chamber 15 of each cylinder 11. In particular, in the present embodiment, a fuel injector 31 is arranged at the center of the top surface of each combustion chamber 15. Each fuel injector 31 is configured so that fuel F is injected from the fuel injector 31 toward the peripheral part in the cavity 16 formed in a piston 14 (FIG. 2).

Each fuel injector 31 is connected through the common rail 32 and fuel feed pipe 33 to the fuel tank 35. In the fuel feed pipe 33, a fuel pump 34 is arranged for pumping out fuel in the fuel tank 35. The fuel pumped by the fuel pump 34 is supplied through the fuel feed pipe 33 to the common rail 32 and, along with the fuel injector 31 being opened, is directly injected from the fuel injector 31 into a combustion chamber 15.

The intake system 40 comprises an intake manifold 41, intake pipe 43, air cleaner 44, compressor 5a of an exhaust turbocharger 5, intercooler 45, and throttle valve 46. The intake ports 17 for each cylinder 11 are communicated with the intake manifold 41, while the intake manifold 41 is communicated through the intake pipe 43 to the air cleaner 44. The intake pipe 43 is provided with the compressor 5a of the exhaust turbocharger 5 for compressing and discharging intake air circulating through the intake pipe 43 and the intercooler 45 for cooling the air compressed by the compressor 5a. The intercooler 45 is arranged downstream of the compressor 5a in the direction of flow of intake air. The throttle valve 46 is arranged in the intake pipe 43 between the intercooler 45 and the intake manifold 41. The throttle valve 46 is turned by the throttle valve drive actuator 47 whereby the opening area of the intake passage can be changed. Note that, the intake ports 17, intake manifold 41, and intake pipe 43 form an intake passage supplying intake gas into a combustion chamber 15.

The exhaust system 50 comprises an exhaust manifold 51, exhaust pipe 52, turbine 5b of an exhaust turbocharger 5, and exhaust post-treatment device 53. The exhaust port 18 of each cylinder 11 is communicated with the exhaust manifold 51, while the exhaust manifold 51 is communicated with the exhaust pipe 52. The exhaust pipe 52 is provided with the turbine 5b of the exhaust turbocharger 5. The turbine 5b is driven to turn by energy of the exhaust gas. The compressor 5a and the turbine 5b of the exhaust turbocharger 5 are connected by a rotary shaft. If the turbine 5b is driven to turn, the compressor 5a turns and therefore the intake air is compressed. Further, the exhaust pipe 52 is provided with the exhaust post-treatment device 53 downstream of the turbine 5b in the direction of flow of exhaust. The exhaust post-treatment device 53 is a device for purifying exhaust gas, then discharging the purified gas into the outside air. The exhaust post-treatment device 53 comprises various types of exhaust purification catalysts for removing harmful substances and a filter for trapping harmful substances. Note that, the exhaust port 18, exhaust manifold 51, and exhaust pipe 52 form an exhaust passage discharging exhaust gas from a combustion chamber 15.

The EGR mechanism 60 comprises an EGR pipe 61, EGR control valve 62, and EGR cooler 63. The EGR pipe 61 is connected to the exhaust manifold 51 and intake manifold 41 and makes them communicated to each other. The EGR pipe 61 is provided with the EGR cooler 63 for cooling the EGR gas flowing through the EGR pipe 61. In addition, the EGR pipe 61 is provided with the EGR control valve 62 enabling change of the opening area of the EGR passage formed by the EGR pipe 61. By controlling the opening degree of the EGR control valve 62, the flow rate of the EGR gas refluxed from the exhaust manifold 51 to the intake manifold 41 is adjusted.

The control device 70 comprises the electronic control unit (ECU) 71 and various types of sensors. The ECU 71 is comprised of a digital computer and comprises components connected with each other through a bidirectional bus 72, such as a RAM (random access memory) 73, ROM (read only memory) 74, CPU (microprocessor) 75, input port 76, and output port 77.

The intake pipe 43 is provided with, at the upstream side of the compressor 5a of the exhaust turbocharger 5 in the direction of flow of intake, an air flow meter 81 for detecting the amount of flow of air flowing through the intake pipe 43. In addition, the intake pipe 43 is provided with a temperature sensor 83 for detecting the temperature of the air flowing through the intake pipe 43 at the upstream side of the intercooler 45 in the direction of flow of intake. The throttle valve 46 is provided with a throttle opening degree sensor 85 for detecting its opening degree (throttle opening degree). In addition, the intake manifold 41 is provided with a pressure sensor 86 for detecting the pressure of the intake gas in the intake manifold 41, that is, the pressure of the intake gas sucked into a cylinder 11 (intake pressure). Furthermore, the intake manifold 41 is provided with a temperature sensor 87 for detecting the temperature of intake gas in the intake manifold 41, that is, the temperature of the intake gas (intake temperature) sucked into a cylinder 11. The outputs of these air flow meter 81, temperature sensor 83, throttle opening degree sensor 85, pressure sensor 86, and temperature sensor 87 are input through corresponding AD converters 78 to the input port 76.

Further, to the accelerator pedal 88, a load sensor 89 is connected for generating an output voltage proportional to the amount of depression of the accelerator pedal 88. The output voltage of the load sensor 89 is input through the corresponding AD converter 78 to the input port 76. Therefore, in the present embodiment, the amount of depression of the accelerator pedal 88 is utilized as the engine load. The crank angle sensor 90 generates an output pulse each time, for example, the crank shaft of the engine body 10 rotates by for example 15 degrees. This output pulse is input to the input port 76. At the CPU 75, the engine speed is calculated from the output pulses of this crank angle sensor 90.

On the other hand, the output port 77 of the ECU 71 is connected through corresponding drive circuits 79 to the actuators for controlling the operation of the internal combustion engine 1. In the example shown in FIGS. 1 and 2, the output port 77 is connected to the fuel injectors 31, fuel pump 34, throttle valve drive actuator 47, and EGR control valve 62. The ECU 71 outputs control signals for controlling these actuators from the output port 77 to control the operation of the internal combustion engine 1.

<Explanation of Swirl Control Valve>

Figure 3:
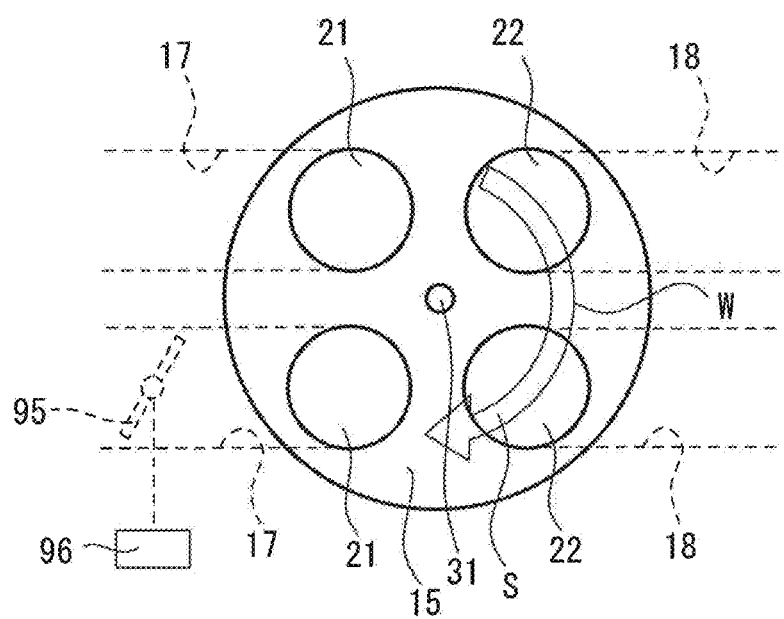
FIG. 3 is a bottom view of a top surface of a combustion chamber.

FIG. 3 is a bottom view of the top surface of a combustion chamber 15. As will be understood from FIG. 3, the engine body 10 comprises a swirl control valve 95 arranged in one of the intake ports of two intake ports 17 communicated with each cylinder 11. The swirl control valve 95 is turned by a swirl control valve drive actuator 96 connected to the swirl control valve 95, and thus it is possible to change the opening area of the intake port 17 at which the swirl control valve 95 is arranged. The swirl control valve drive actuator 96 is connected to the output port 77. Note that, the swirl control valve 95 may also be provided in the intake manifold 41 so long as able to control the amount of flow of only the intake gas flowing through one of the two intake ports 17.

If the thus configured swirl control valve 95 is closed, the intake gas flows through only the intake port 17 at which the swirl control valve 95 is not provided, into the combustion chamber 15. As a result, in the combustion chamber 15, a swirl flow such as shown by the arrow W in FIG. 3 is generated. On the other hand, if the swirl control valve 95 is fully opened, the intake gas flows through both intake ports 17 to the combustion chamber 15. As a result, in the combustion chamber 15, almost no swirl flow W is generated. This swirl flow W changes according to the opening degree of the swirl control valve 95 and becomes stronger as the opening degree of the swirl control valve 95 becomes smaller. Therefore, the swirl control valve 95 can control the strength of the swirl flow generated in the combustion chamber 15 and accordingly can control the swirl ratio. Note that, the "swirl ratio" means the ratio of the rotational speed of the swirl flow in the combustion chamber 15 with respect to the engine speed. The stronger the flow generated in the combustion chamber 15, the higher the swirl ratio becomes.

Note that, in the present embodiment, as the swirl control device controlling the strength of the swirl flow generated in a combustion chamber 15, the swirl control valve 95 is used. However, if possible to control the strength of the swirl flow, it is also possible to use a swirl control device besides the swirl control valve 95. Further, in the intake pipe 43, it is also possible to not provide the throttle valve 46, but to provide both of the two intake ports 17 with control valves for changing the opening areas of these intake ports 17. In this case, these control valves are controlled so as to perform of the functions of both the throttle valve 46 and the swirl control valve 95 (that is, the control of the amount of the intake gas supplied into a combustion chamber 15 and the control of the swirl ratio).

<Control of Swirl in Steady State>

Figure 4:
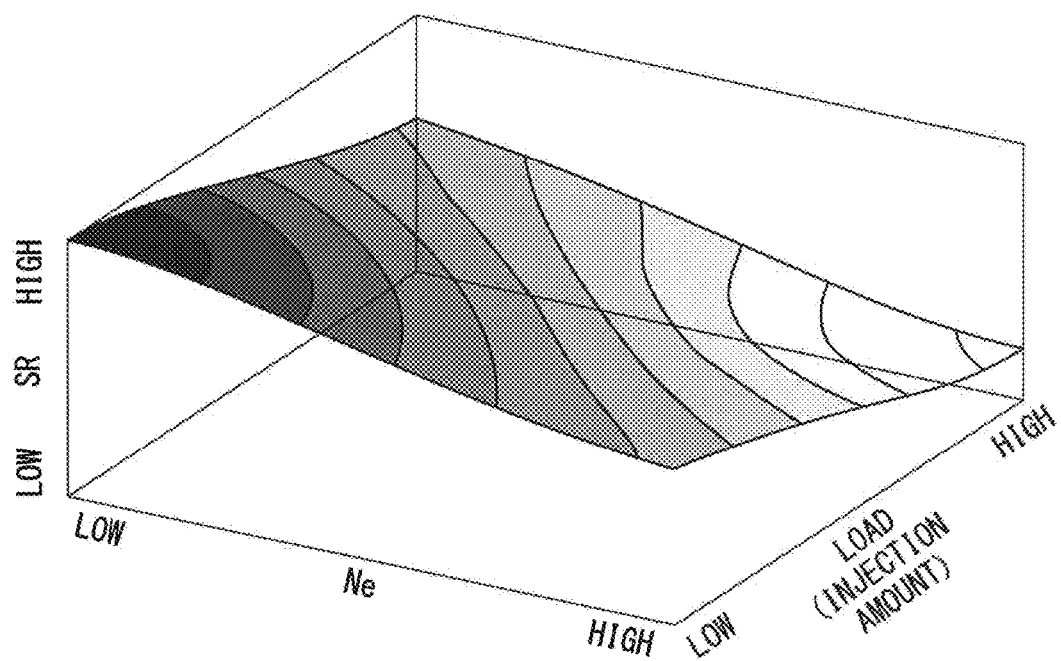
FIG. 4 is a view showing a relationship between an engine operating state and a target value of a swirl ratio in that engine operating state.

Next, referring to FIG. 4, control of the swirl ratio when the internal combustion engine is engaged in steady operation will be explained. FIG. 4 is a view showing the relationship between the engine speed and engine load (that is, the "engine operating state"), and the target value of the swirl ratio at that engine operating state.

Note that, in this Description, the time when "the internal combustion engine is engaged in steady operation" means the time where the engine operating state (engine load and engine speed) is maintained without changing and other parameters relating to operation of the internal combustion engine has converged without changing much at all. Therefore, when the engine load and engine speed are maintained substantially constant and amounts of change per unit time in the suction intake gas amount, supercharging pressure and the EGR rate are small amounts of predetermined values or less, it can be said that the internal combustion engine is in the middle of steady operation.

On the other hand, the time when "the internal combustion engine is engaged in a transient operation" means the time when the engine operating state is changing and the time when as a result of the engine operating state changing, the other parameters relating to operation of the internal combustion engine (for example, suction intake gas amount, supercharging pressure, EGR rate, etc.) are changing. Therefore, when as a result of a rise of the engine load, the engine speed increases, when the suction intake gas amount increases, when the supercharging pressure increases, when the EGR rate changes, etc., it can be said that the internal combustion engine is engaged in a transient operation.

As shown in FIG. 4, in the present embodiment, when the internal combustion engine is engaged in a steady operation, the lower the engine speed, the higher the target value of the swirl ratio is set. In this regard, when the engine speed is low, the flow rate of the intake gas flowing into a combustion chamber 15 is slow. As a result, even if the swirl ratio is the same, when the engine speed is low, the flow rate of the swirl flow generated in the combustion chamber 15 is slow. If the flow rate of the swirl flow generated in the combustion chamber 15 is slow in this way, as a result, the air and fuel are unable to be sufficiently mixed. Therefore, in the present embodiment, when the engine speed is low, the target value of the swirl ratio is set high.

On the other hand, when the engine speed is high, even if the swirl ratio is the same, the flow rate of the swirl flow generated in a combustion chamber 15 is fast and therefore the air and fuel easily mix. On the other hand, the higher the swirl ratio and thus the faster the flow rate of the swirl flow, the greater the transmission of convective heat between the air-fuel mixture in the combustion chamber 15 and the wall surfaces of the cylinder. That is, the heat generated in the combustion chamber 15 is easily robbed by the wall surfaces of the cylinder and as a result heat efficiency decreases. Therefore, in the present embodiment, when the engine speed is high, the target value of the swirl ratio is set low.

In addition, as shown in FIG. 4, in the present embodiment, when the internal combustion engine is engaged in steady operation, the target value of the swirl ratio is set high when the engine load is a low load, the target value of the swirl ratio is set to a medium extent when the engine load is a medium load, and the target value of the swirl ratio is set low when the engine load is a high load.

Note that, in this Description, the time when the brake mean effective pressure is less than the first reference value (for example, 0.5 MPa) is called the time when the engine load is a low load. The first reference value is a value of less than half the brake mean effective pressure when the engine load is the maximum (full load). Further, in the present embodiment, the time when the brake mean effective pressure is equal to or greater than the first reference value and less than a second reference value larger than the first reference (for example, 1.0 MPa) is referred to as the time when the engine load is a medium load, while the time when the brake mean effective pressure is equal to or greater than the second reference value is referred to as the time when the engine load is a high load. In some embodiments, the second reference value is equal to or greater than a value of half of the brake mean effective pressure when the engine load is the maximum (full load).

In this regard, the amount of generation of smoke is smaller, as the air-fuel ratio of the air-fuel mixture when burning the mixture in a combustion chamber 15 is higher (the lean degree is higher). Further, the amount of generation of NOx is smaller, as the EGR rate is higher. Therefore, from the viewpoint of reducing the smoke and the NOx, it is useful that the amount of intake gas sucked into the combustion chamber 15 (below, referred to as the "suction intake gas amount") be large. Therefore, in the present embodiment, to reduce the smoke or NOx generated along with combustion of the air-fuel mixture in the combustion chamber 15, the suction intake gas amount is controlled to be greater and the EGR rate is controlled to be a suitable value. Specifically, the higher the engine load, that is, the greater the fuel injection amount from the fuel injector 31, the greater the suction intake gas amount into the combustion chamber 15. This is due to the fact that the higher the engine load, the higher the supercharging pressure becomes and thus the greater the suction intake gas amount to the combustion chamber 15.

Therefore, when the engine load is a low load, the suction intake gas amount to a combustion chamber 15 is small. For this reason, at this time, the flow rate of intake gas flowing into the combustion chamber 15 is slow. Therefore, in the combustion chamber 15, the air-fuel mixture is difficult to disturb and therefore the air and fuel are no longer able to be sufficiently mixed. Therefore, in the present embodiment, when the engine load is a low load, the target value of the swirl ratio is set high.

On the other hand, when the engine load is a high load, the suction intake gas amount to a combustion chamber 15 is greater, compared with the time of a low load. For this reason, at this time, the flow rate of the intake gas flowing into the combustion chamber 15 is fast and thus the air and fuel can be sufficiently mixed. On the other hand, if the swirl ratio becomes too high, the heat generated in the combustion chamber 15 is easily robbed by the wall surfaces of the cylinder. Therefore, in the present embodiment, when the engine load is a high load, the target value of the swirl ratio is set low.

<Cooling Loss at Time of Transient Operation>

Figure 5A:
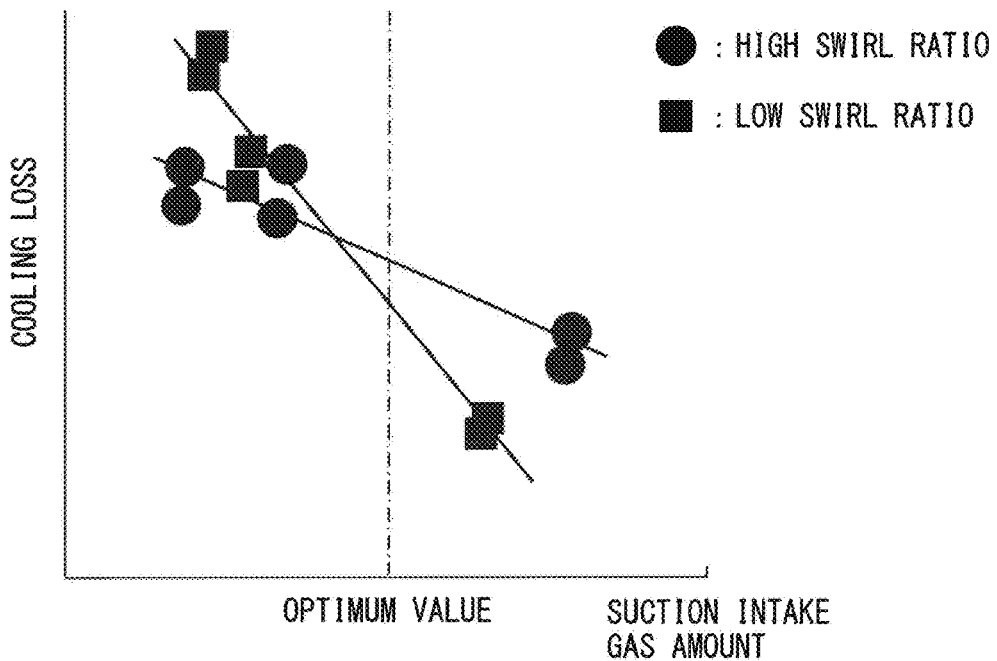
FIG. 5A is a view showing a relationship between an amount of flow of intake gas sucked into a combustion chamber and a cooling loss.
Figure 5B:
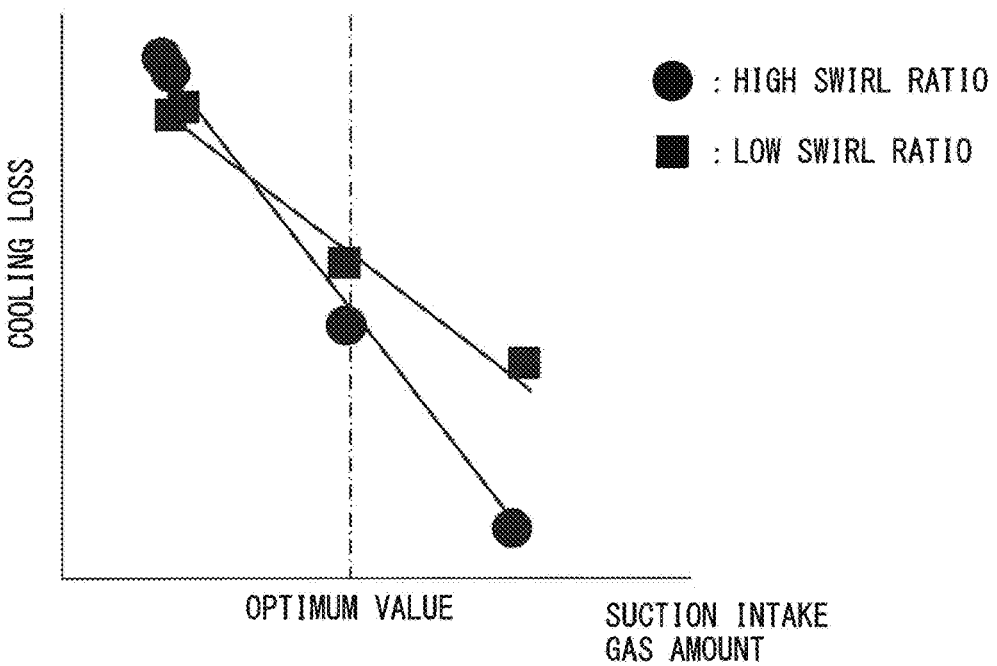
FIG. 5B is a view showing a relationship between an amount of flow of intake gas sucked into a combustion chamber and a cooling loss.

According to research of the inventors of the present application, it was learned that when an internal combustion engine is engaged in a transient operation, the optimum swirl ratio differs according to the operating state of the transient operation. FIGS. 5A and 5B are views showing the relationship between the suction intake gas amount to a combustion chamber 15 and the cooling loss. In particular, FIG. 5A shows the relationship in the case where the engine load is a low load and the amount of fuel injection from a fuel injector 31 is relatively small, while FIG. 5B shows the relationship in the case where the engine load is a high load and the amount of fuel injection from a fuel injector 31 is relatively large. Note that, the black dots in the figures show the case where the swirl ratio is high (2.1 or so), while the black squares in the figures show the case where the swirl ratio is low (1.1 or so).

In this regard, as explained above, if considering the exhaust emission, the higher the engine load, that is, the larger the fuel injection amount from a fuel injector 31, the greater the optimum suction intake air amount to a combustion chamber 15. Therefore, in the present embodiment, the higher the engine load, the greater the suction intake gas amount into the combustion chamber 15.

When the internal combustion engine is engaged in a steady operation, the fuel injection amount worn a fuel injector 31 and the suction intake gas amount to a combustion chamber 15 become optimum values corresponding to the engine load. However, when the internal combustion engine is engaged in a transient operation, the suction intake gas amount into the combustion chamber 15 does not always become a suitable value corresponding to the engine load.

That is, the fuel injection amount from a fuel injector 31 is fast in response speed and can be changed in an instant, and therefore can be immediately changed to a fuel injection amount corresponding to the engine load after change of the engine load when it changes. On the other hand, the suction intake gas amount into a combustion chamber 15 is slow in response speed, and therefore cannot be quickly changed. For this reason, when the engine load changes, the suction intake gas amount is gradually changed to the amount corresponding to the engine load after change. As a result, when the internal combustion engine is engaged in a transient operation, the fuel injection amount from the fuel injector 31 is an amount corresponding to the engine load, but sometimes the suction intake gas amount to the combustion chamber 15 is not an amount corresponding to the engine load.

The example shown in FIG. 5A shows the case where the engine load is low and accordingly the fuel injection amount from a fuel injector 31 is relatively small (for example, 13 mm$^3$/st). In addition, the example shown in FIG. 5A shows the case where the engine speed is maintained at 800 rpm is shown.

The region where the suction intake gas amount is smaller than the optimum value of FIG. 5A shows the case where the internal combustion engine is engaged in a transient operation and the engine load before the change is lower than the current engine load. In such a case, the suction intake gas amount before the change of the engine load is smaller than the optimum suction intake gas amount at the current engine load and therefore the suction intake gas amount gradually increases during the transient operation.

On the other hand, the region where the suction intake gas amount is larger than the optimum value of FIG. 5A shows the case where the internal combustion engine is engaged in a transient operation and the engine load before the change is higher than the current engine load. In such a case, the suction intake gas amount before the change of the engine load is larger than the optimum suction intake gas amount at the current engine load and therefore the suction intake gas amount gradually decreases during the transient operation.

As will be understood from FIG. 5A, if the engine load is a low load, when the suction intake gas amount is smaller than the optimum value the higher the swirl ratio, the lower the cooling loss. On the other hand if the engine load is a low load, when the suction intake gas amount is larger than the optimum value, the lower the swirl ratio, the lower the cooling loss. The reason why such a phenomenon occurs is not necessarily clear, but it is learned that when the suction intake gas amount is smaller than the optimum value, the lower the swirl ratio, the slower the combustion of the air-fuel mixture and thus the more easily the after burn, in which the heat release rate at the latter half of the combustion period is higher, occurs. Similarly, it is learned that when the suction intake gas amount is larger than the optimum value, the higher the swirl ratio, the slower the combustion of the air-fuel mixture and thus the more easily the after burn occurs.

On the other hand, the example shown in FIG. 5B shows the case where the engine load is high and accordingly the amount of fuel injection from a fuel injector 31 is relatively large (for example, 63 mm$^3$/st). In addition, the example shown in FIG. 5B shows the case where the engine speed is maintained at 2000 rpm.

As will be understood from FIG. 5B, if the engine load is the high load, when the suction intake gas amount is smaller than the optimum value, the lower the swirl ratio, the lower the cooling loss. On the other hand, if the engine load is the high load, when the suction intake gas amount is larger than the optimum value, the higher the swirl ratio, the lower the cooling loss. The reason why such a phenomenon occurs is not necessarily clear, but it is learned that when the suction intake gas amount is smaller than the optimum value, the higher the swirl ratio, the slower the combustion of the air-fuel mixture and thus the more easily the after burn occurs. Similarly, it is learned that when the suction intake gas amount is greater than the optimum value, the lower the swirl ratio, the slower the combustion of the air-fuel mixture and thus the more easily the after burn occurs.

Note that, it is learned that in the case where the engine load is the medium load, a trend between the example shown in FIG. 5A and the example shown in FIG. 5B is exhibited. Therefore, the relationship between the cooling loss and the suction intake gas amount is the same relationship regardless of the swirl ratio. That is, if the engine load is the medium load, regardless of whether the suction intake gas amount is greater than or smaller than the optimum value, even if the swirl ratio changes, the cooling loss does not greatly change.

<Control of Swirl Ratio at Time of Transient Operation>

Therefore, in the present embodiment, when the engine load is lower than a predetermined load, the swirl control valve 95 is controlled so that the swirl ratio is higher when the suction intake gas amount increases compared to when it decreases. That is, in the present embodiment, the swirl control valve 95 is controlled so that, in FIG. 5A, the swirl ratio is higher when the suction intake gas amount is smaller than the optimum value, compared with when the suction intake gas amount is greater than the optimum value.

In particular, in the present embodiment, when the engine load is lower than a predetermined load, the swirl control valve 95 is controlled so that the swirl ratio is lower than the target value of the swirl ratio set based on the engine load L, etc., by using a map such as shown in FIG. 4 (that is, the target value of the swirl ratio when the engine is engaged in steady operation, which is hereinafter referred to as the "steady state target value of the swirl ratio") when the suction intake gas amount is larger than the optimum value. Specifically, the opening degree of the swirl control valve 95 is corrected to be larger than the basic target opening degree corresponding to the steady state target value of the swirl ratio.

On the other hand, if the engine load is lower than the predetermined load, when the suction intake gas amount is smaller than the optimum value, the swirl control valve 95 is controlled so that the swirl ratio is higher than the steady state target value of the swirl ratio based on the engine load, etc. Specifically, the opening degree of the swirl control valve 95 is corrected so as to be smaller than the basic target opening degree corresponding to the steady state target value of the swirl ratio.

Further, in the present embodiment, when the engine load is lower than the predetermined load, the swirl control valve 95 is controlled so that the difference of the swirl ratio from the steady state target value is larger as the difference between the current suction intake gas amount and the optimum value thereof is larger. In addition, when the engine load is lower than the predetermined load, the swirl control valve 95 is controlled so that the difference of the swirl ratio from the steady state target value is larger as the engine load is lower (that is, as the engine load is further away from the predetermined load).

In addition, in the present embodiment, when the engine load is higher than the predetermined load, the swirl control valve 95 is controlled so that the swirl ratio becomes lower when the suction intake gas amount is increasing, compared to when it is decreasing. That is, in the present embodiment, in FIG. 5B, the swirl control valve 95 is controlled so that the swirl ratio is lower when the suction intake gas amount is smaller than the optimum value, compared to when it is greater than the optimum value.

In particular, in the present embodiment, when the engine load is higher than the predetermined load, when the suction intake gas amount is larger than the optimum value, the swirl control valve 95 is controlled so that the swirl ratio is higher than the steady state target value of the swirl ratio based on the engine load, etc. Specifically, the opening degree of the swirl control valve 95 is corrected so as to be smaller than the basic target opening degree corresponding to the steady state target value of the swirl ratio.

On the other hand, when the engine load is higher than the predetermined load, when the suction intake gas amount is smaller than the optimum value, the swirl control valve 95 is controlled so that the swirl ratio is lower than the steady state target value of the swirl ratio based on the engine load, etc. Specifically, the opening degree of the swirl control valve 95 is corrected so as to be larger than the basic target opening degree corresponding to the steady state target value of the swirl ratio.

Further, in the present embodiment, even when the engine load is higher than the predetermined load, the swirl control valve 95 is controlled so that the difference of the swirl ratio from the steady state target value is larger as the difference between the current suction intake gas amount and the optimum value thereof is larger. In addition, when engine load is higher than the predetermined load, the swirl control valve 95 is controlled so that the difference of the swirl ratio from the steady suite target value is larger as the engine load is higher (that is, as the engine load is further away from the predetermined load).

FIG. 6 is a time chart showing the transitions in the engine speed NE, engine load L, fuel injection amount Q from a fuel injector 31, suction intake gas amount Gc sucked into a combustion chamber 15, and swirl ratio SR, when the engine load falls in a step-wise manner. In the example shown in FIG. 6, the engine load L, falls from the high load L1 to the medium load L2 in a step-wise manner at the time t1, and the engine load L falls from the medium load L2 to the low load L3 in a step-wise manner at the time t3. Further, in the example shown in FIG. 6, the engine speed NE is maintained at the medium extent rotational speed NE2.

As shown in FIG. 6, before the time t1, the engine load L is set to the high load L1, and thus the fuel injection amount Q is also set to the relatively large Q1. Further, the suction intake gas amount Gc to a combustion chamber 15 is also the relatively large Gc1. In addition, at this time, the swirl control valve 95 is controlled so that the swirl ratios SR3 equal to the target value set based on the engine load L, etc., by using a map such as shown in FIG. 4 (steady state target value of the swirl ratio).

Further, in the example shown in FIG. 6, at the time t1, the engine load L is changed front the high load L1 to the medium load L2. Along with this, the fuel injection amount Q is changed to Q2 smaller than Q1. In addition, at the time t1, the suction intake gas amount is decreased toward the suction intake gas amount Gc2 corresponding to the engine load L2. However, as explained above, the response speed of the suction intake gas amount Gc is slow, and therefore the suction intake gas amount Gc gradually decreases after the fuel injection amount Q is changed at the time t1. Therefore, it can be said that in the period front the time t1 to the time t2, the engine is engaged in a transient operation where the suction intake gas amount Gc is greater than the optimum value (broken line in figure).

In addition, in the illustrated example, if the engine load L becomes the medium load L2 at the time t1, the steady state target value of the swirl ratio based on the engine load rises to SR2. At this time, the suction intake gas amount Gc is greater than the optimum value in state, but the engine load L is the medium load L2, and therefore the swirl ratio SR is substantially equal to the steady state target value.

Next, in the example shown in FIG. 6, at the time t3, the engine load L is changed from the medium load L2 to the low load L3. In this case as well, the response speed of the suction intake gas amount Gc is slow, and therefore the suction intake gas amount Gc gradually decreases from the time t3. For this reason, from the time t3 to the time t4, it can be said that the engine is engaged in a transient operation where the suction intake gas amount Gc is greater than the optimum value (broken line in the figure).

If the engine load L becomes the low load L3 at the time t3, the steady state target value of the swirl ratio based on the engine load changes to the relatively high value SR1. However, at this time, the suction intake gas amount Gc is greater than the optimum value, and the engine load L is the low load L3. Therefore, in the present embodiment, from the time t3 to the time t4, the swirl control valve 95 is controlled so that the swirl ratio SR is a value lower than the steady state target value SR1 of the swirl ratio. Further, the swirl control valve 95 is controlled so that the swirl ratio SR gradually approaches the steady state target value of the swirl ratio SR1, as the suction intake gas amount Gc approaches the optimum value. In the example shown in FIG. 6, at the time t4, the suction intake gas amount Gc reaches the suction intake gas amount Gc3 corresponding to the engine load L3. Simultaneously with this, the swirl control valve 95 is controlled so that the swirl ratio SR also approaches the steady state target value SR1 of the swirl ratio.

In the example shown in FIG. 6, in the period from the time t3 to the time t4, in which the suction intake gas amount is greater than the optimum value, the swirl control valve 95 is controlled so that the swirl ratio SR is a value lower than the steady state target value of the swirl ratio. That is, during this period, the opening degree of the swirl control valve 9 is corrected to be larger than the reference target opening degree corresponding to the steady state target value of the swirl ratio. Due to this, as explained in FIG. 5A, it is possible to reduce the cooling loss and therefore the heat efficiency when the internal combustion engine is engaged in a transient operation can be maintained high.

Figure 7:
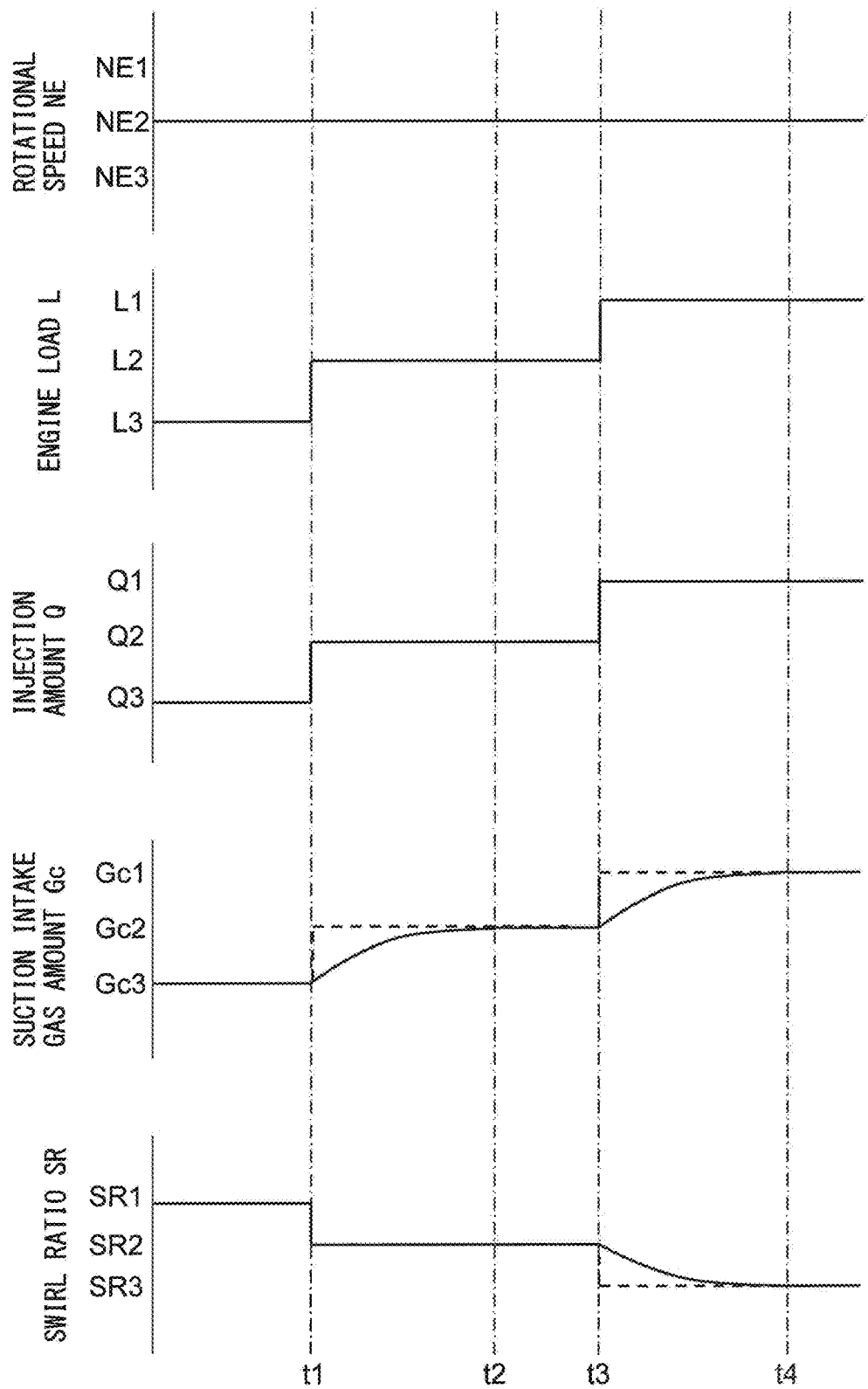
FIG. 7 is a time chart, similar to FIG. 6, showing transitions in an engine speed, etc., when an engine load rises in stages.

FIG. 7 is a time chart, similar to FIG. 6, showing the transitions in the engine speed NE, etc., when the engine load rises in a step-wise manner. In the example shown in FIG. 7, the engine load L rises from the low load L3 to the medium load L2 in a step-wise manner at the time t1, and the engine load L rises from the medium load L2 to the high load L1 in a step-wise manner at the time t3.

As shown in FIG. 7, before the time t1, the engine load L is set to the low load L3 and the suction intake gas amount Gc to a combustion chamber 15 is a relatively small Gc3. In addition, at this time, the swirl control valve 95 is controlled so that the swirl ratio is an SR1 equal to the steady state target value of the swirl ratio based on the engine load L, etc.

Further, in the example shown in FIG. 7, at the time t1, the engine load L is changed from the low load L3 to the medium load L2. Along with this, the suction intake gas amount Gc gradually increases so as to become a suction intake gas amount Gc2 corresponding to the engine load L2. Therefore, from the time t1 to the time t2, it can be said that the engine is engaged in a transient operation where the suction intake gas amount Gc is smaller than the optimum value.

In addition, in the illustrated example, if the engine load L becomes the medium load L2 at the time t1, the steady state target value of the swirl ratio based on the engine load falls to SR2. In this case, as explained above, from the time t1 to the time t2, the suction intake gas amount Gc is smaller than the optimum value, but the engine load L is the medium load L2, and therefore the swirl ratio SR is substantially equal to the steady state target value.

Next, at the time t3, the engine load L is changed from the medium load L2 to the high load L1. In this case as well, since the response speed of the suction intake gas amount Gc is slow, the suction intake gas amount Gc gradually increases. If the engine load L becomes the high load L1 at the time t3, the steady state target value of the swirl ratio based on this engine load changes to the relatively low value SR3. At this time, the suction intake gas amount Gc is smaller than the optimum value and the engine load L is the high load L1. Therefore, in the present embodiment, the swirl control valve 95 is controlled so that the swirl ratio SR is a value higher than the steady state target value of the swirl ratio SR3, from the time t3 to the time t4. Further, the swirl control valve 95 is controlled so that the swirl ratio SR gradually approaches the steady state target value of the swirl ratio SR3, as the suction intake gas amount Gc approaches the optimum value.

In the example shown in FIG. 7, the swirl control valve 95 is controlled so that the swirl ratio SR is a value higher than the steady state target value of the swirl ratio, in the period from the time t3 to the time t4, in which the suction intake gas amount is smaller than the optimum value. That is, during this period, the opening degree of the swirl control valve 95 is corrected to be smaller than the reference target opening degree corresponding to the steady state target value of the swirl ratio. Due to this, as explained in FIG. 5B, it is possible to reduce the cooling loss and accordingly maintain high the heat efficiency when the internal combustion engine is in a transient operation.

Figure 8:
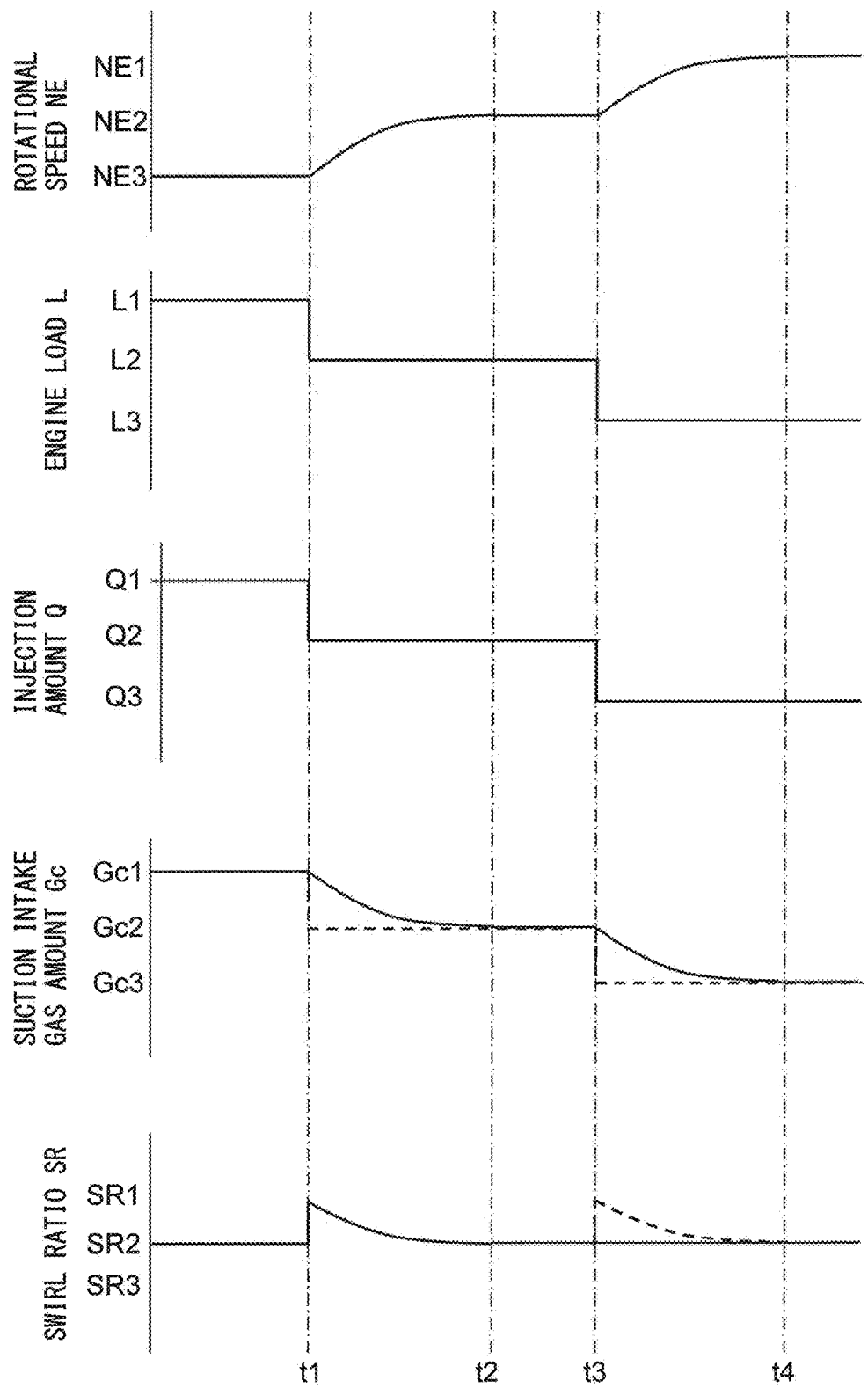
FIG. 8 is a time chart, similar to FIG. 6, showing transitions in an engine speed, etc., when an engine load falls in stages.

FIG. 8 is a time chart, similar to FIG. 6, showing the transitions in the engine speed NE, etc., when the engine load falls in stages. In the example shown in FIG. 8, the engine speed NE gradually rises from the time t1 to the time t2, while the engine speed NE gradually rises from the time t3 to the time t4.

In the example shown in FIG. 8, if the engine load falls from the high load L1 to the medium load L2 at the time t1, the suction intake gas amount gradually decreases toward the suction intake gas amount Gc2 corresponding to the engine load L2.

In addition, in the illustrated example, if the engine load becomes L2 at the time t1, the steady state target value of the swirl ratio based on the engine load rises to SR1. At this time, suction intake gas amount Gc is larger than the optimum value, but the engine load L is the medium load L2, and therefore the swirl ratio SR is substantially equal to the steady state target value. After that, in the example shown in FIG. 8, the engine speed NE gradually rises from NE3 to NE2, and thus the swirl ratio SR also gradually falls.

Next, at the time t3, the engine load L is changed from the medium load L2 to low load L3, and thus the suction intake gas amount Gc gradually decreases toward Gc3. If the engine load L becomes the low load L3 at the time t3, the steady state target value of the swirl ratio based on the engine load changes to a relatively high value SR1. However, at this time, the suction intake gas amount GC is larger than the optimum value and the engine load L is the low load L3. Therefore, in the present embodiment, from the time t3 to the time t4, the swirl control valve 95 is controlled so that the swirl ratio SR is a value lower than the steady state target value of the swirl ratio SR1. In addition, in the example shown in FIG. 8, from the time t3 to the time t4, the engine speed NE gradually rises from NE2 to NE1, and thus the steady state target value of the swirl ratio gradually falls from SR1 to SR2. As a result, in the example shown in FIG. 8, the swirl ratio SR is maintained substantially constant at SR2 from the time t3 to the time t4. By performing such control, the cooling loss can be decreased.

Figure 9:
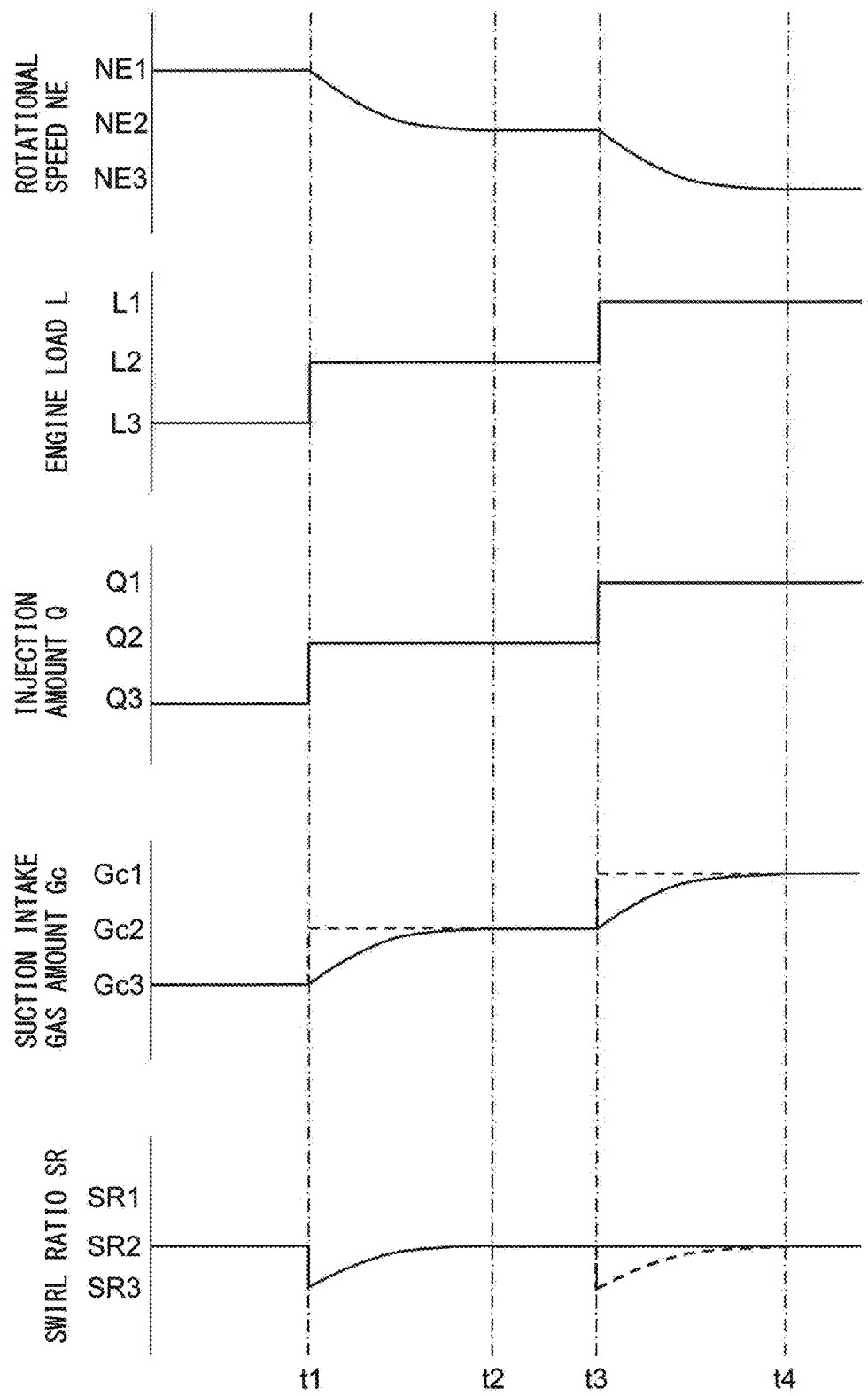
FIG. 9 is a time chart, similar to FIG. 8, showing transitions in an engine speed, etc., when an engine load rises in stages.

FIG. 9 is a time chart, similar to FIG. 7, showing the transitions in the engine speed NE, etc., when the engine load rises hi a step-wise manner. In the example shown in FIG. 9, from the time t1 to the time t2, the engine speed NE gradually falls, while from the time t3 to the time t4, the engine speed NE gradually falls.

In the example shown in FIG. 9, if the engine load rises from the low load L3 to the medium load L2 at the time t1, and thus the suction intake gas amount Gc gradually increases toward the suction intake gas amount Gc2 corresponding to the engine load L2.

In addition, in the illustrated example, if the engine load becomes L2 at the time t1, the steady state target value of the swirl ratio based on the engine load falls to SR3. At this time, the suction intake gas amount Gc is smaller than the optimum value, but the engine load L is the medium load L2, and therefore the swirl ratio SR is substantially equal to the steady state target value. After that, in the example shown in FIG. 9, the engine speed NE gradually falls from NE1 to NE2, and thus the swirl ratio SR also gradually rises.

Next, at the time t3, the engine load L is changed from the medium load L2 to the high load L1, and thus the suction intake gas amount Gc gradually increases toward Gc1. If at the time t3 the engine load L becomes a high load L1, the steady state target value of the swirl ratio based on the engine load changes to the relatively low value SR3. However, at this time, the suction intake gas amount Gc is smaller than the optimum value and the engine load L is the high load L1. Therefore, in the present embodiment, from the time t3 to the time t4, the swirl control valve 95 is controlled so that the swirl ratio SR is a value higher than the steady state target value of the swirl ratio SR3. In addition, in the example shown in FIG. 9, from the time t3 to the time t4, the engine speed NE gradually falls from NE2 to NE3, and thus the steady state target value of the swirl ratio gradually rises from SR3 to SR2. As a result, in the example shown in FIG. 9, the swirl ratio SR is maintained substantially constant at SR2 from the time t3 to the time t4. By performing such control, the cooling loss can be decreased.

FIG. 10 is a view showing the relationship between the engine load and suction intake gas amount, and the set value of the swirl ratio of the present embodiment, and summarizes the settings of swirl ratio at the above-mentioned states. As shown in FIG. 10, if the engine load is between a low load and a medium extent of the medium load (for example, brake mean effective pressure of 0.75 MPa), when the suction intake gas amount is smaller than the optimum value, the swirl ratio is set to a value higher than the steady state target value. Therefore, the opening degree of the swirl control valve 95 is controlled to an opening degree smaller than a reference target opening degree. On the other hand, when the suction intake gas amount is greater than the optimum value, the swirl ratio is set to a value lower than the steady state target value. Therefore, the opening degree of the swirl control valve 95 is controlled to an opening degree larger than the reference target opening degree.

In particular, in the present embodiment, when the engine load is between a low load and a medium extent of the medium load, the difference of the swirl ratio from the steady state target value is larger as the difference between the current suction intake gas amount and the optimum value thereof is larger. Therefore, in the present embodiment, control is performed so that the difference of the opening degree of the swirl control valve 95 from the reference target opening degree is larger (that is, so that the opening degree of the swirl control valve 95 is larger), as the difference between the current suction intake gas amount and the optimum value thereof is larger.

Further, in the present embodiment, when the engine load is between a low load and a medium extent of the medium load, the difference of the swirl ratio from the steady state target value is larger, as engine load is lower. Therefore, in the present embodiment, in this case, the swirl control valve 95 is controlled so that the difference of the opening degree of the swirl control valve 95 from the reference target opening degree is larger, as the engine load is lower.

On the other hand, as shown in FIG. 10, when the engine lead is between a medium extent of the medium load (for example, brake mean effective pressure of 0.75 MPa) to high load, when the suction intake gas amount is smaller than the optimum value, the swirl ratio is set to a value lower than the steady state target value. Therefore, the opening degree of the swirl control valve 95 is controlled to an opening degree larger than the reference target opening degree. On the other hand, when the suction intake gas amount is larger than the optimum value, the swirl ratio is set to a value higher than the steady state target value. Therefore, the opening degree of the swirl control valve 95 is controlled to an opening degree smaller than the reference target opening degree.

In particular, in the present embodiment, even when the engine load is between a medium extent of the medium load and a high load, the difference of the swirl ratio from the steady state target value is larger, as the difference of the current suction intake gas amount and the optimum value thereof is larger. Therefore, in the present embodiment, control is performed so that as the difference between the current suction intake gas amount and the optimum value thereof is larger, the difference of the opening degree of the swirl control valve 95 from the reference target opening degree is larger (that is, so that the opening degree of the swirl control valve 95 is smaller).

Further, in the present embodiment, when the engine load is between a medium extent of the medium load and a high load, the difference of the swirl ratio from the steady state target value is larger, as the engine load is higher. Therefore, in the present embodiment, in this case, the swirl control valve 95 is controlled so that the difference of the opening degree of the swirl control valve 9 horn the reference target opening degree is larger, as the engine load is higher.

If changing the way of viewing this, as shown in FIG. 10, in the present embodiment, when the suction intake gas amount is smaller than the optimum value, that is, when the suction intake gas amount is increasing, if the engine load is low, the swirl ratio is set to a value higher than the steady state target value, and therefore the opening degree of the swirl control valve 95 is set smaller than the basic target opening degree. Conversely, at this time, if the engine load is high, the swirl ratio is set to a value lower than the steady state target value, and accordingly the opening degree of the swirl control valve 95 is set larger than the basic target opening degree. For this reason, in the present embodiment, it can be said that when correcting the basic target opening degree of the swirl control valve 95 along with an increase in the suction intake gas amount, the correction amount in a direction increasing the swirl ratio is set smaller when the engine load is relatively high, compared to when it is low.

On the other hand, as shown in FIG. 10, in the present embodiment, when the suction intake gas amount is greater than the optimum value, that is, when the suction intake gas amount is decreasing, if the engine load is low, the swirl ratio is set to a value lower than the steady state target value, and accordingly the opening degree of the swirl control valve 95 is set larger than the basic target opening degree. Conversely, if, at this time, the engine load is high, the swirl ratio is set to a value higher than the steady state target value, and accordingly the opening degree of the swirl control valve 95 is set smaller than the basic target opening degree. For this reason, in the present embodiment, it can be said that when correcting the basic target opening degree of the swirl control valve 95 along with a decrease in the suction intake gas amount, the correction amount in a direction increasing the swirl ratio is set larger when the engine load is relatively high, compared to when it is low.

<Flow Chart>

Figure 11:
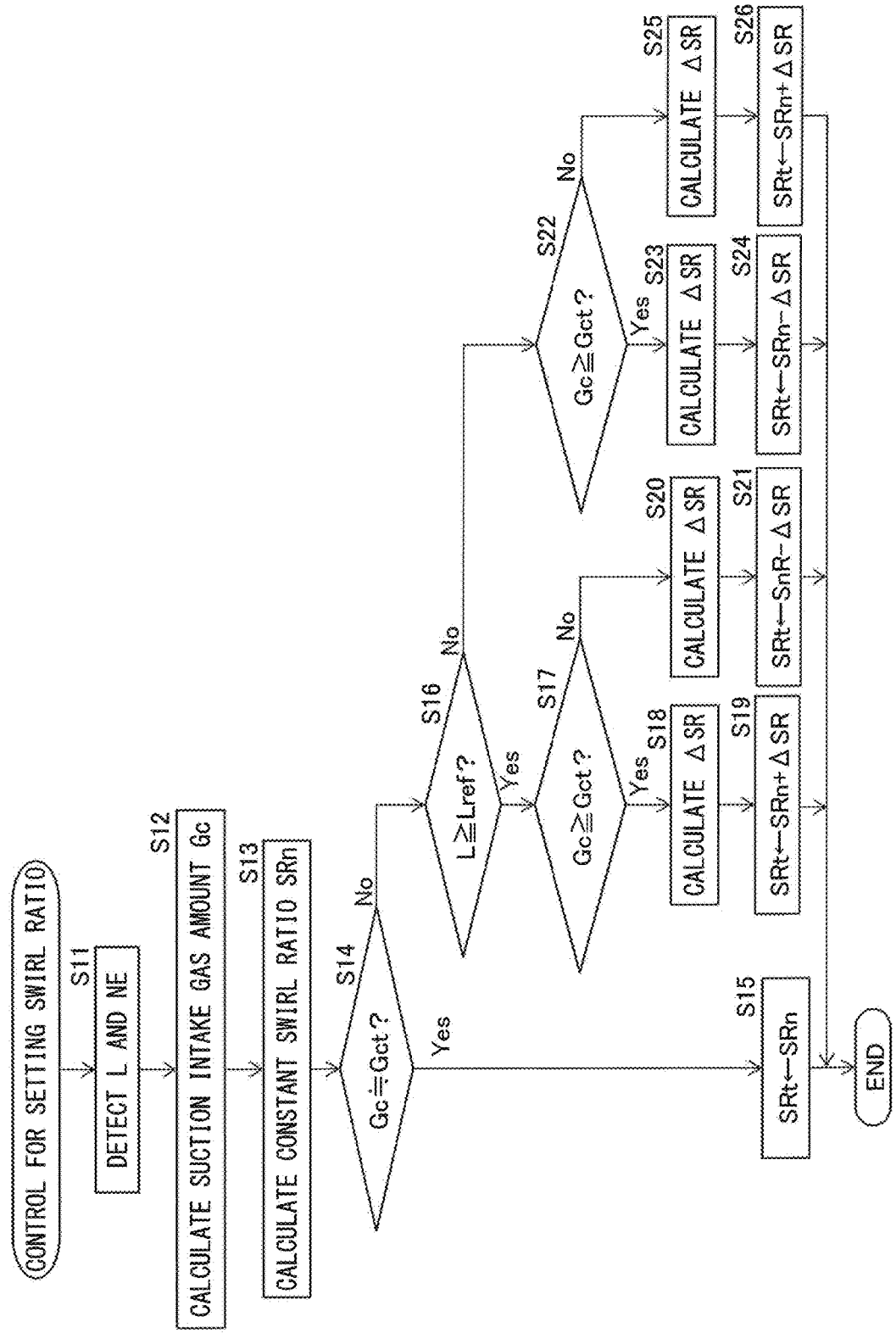
FIG. 11 is a flow chart showing a control routine of control for setting a swirl ratio.

FIG. 11 is a flow chart showing a control routine of control for setting the swirl ratio. The illustrated control routine is performed every certain time interval.

First at step S11, the engine load L and engine speed NE are calculated based on the outputs of the load sensor 89 and crank angle sensor 90. Next, at step S12, the suction intake gas amount Gc to a combustion chamber 15 is calculated. The suction intake gas amount Gc to the combustion chamber 15 is calculated by various methods.

In a first method of calculation, the suction intake gas amount to a combustion chamber 15 is calculated based on the pressure and temperature of the intake gas detected by the pressure sensor 86 and temperature sensor 87 provided at the intake manifold 41. In this case, the suction intake gas amount into the combustion chamber 15 is calculated from the volume in the combustion chamber 15 when the intake valve 21 is closed and the pressure and temperature of the intake gas.

In a second method of calculation, the amount of air taken into a combustion chamber 15 (fresh air) is calculated based on the output of the air flow meter 81, while the amount of EGR gas sucked into the combustion chamber 15 is calculated by convergence calculation based on the pressure and temperature of the intake gas detected by the pressure sensor 86 and temperature sensor 87. Further, the suction intake gas amount is calculated as the sum of the amount of air and amount of EGR gas sucked into the combustion chamber 15 calculated as above.

Next, at step S13, the steady state target value SRn of the swirl ratio is calculated based on the engine load and engine speed NE detected at step S11, by using the map such as shown in FIG. 4.

Next, at step S14, it is judged if the current suction intake gas amount Gc calculated at step S12 is substantially the same as the target value Gct of the suction intake gas amount. In this regard, the target value Gct of the suction intake gas amount is calculated based on the engine load L and engine speed NE, by using a map. This map is prepared in advance by experiments or calculations so as to enable calculation of the suction intake gas amount where the exhaust emission becomes optimum (the above-mentioned optimum value) based on the engine load L and engine speed NE.

If at step S14 it is judged that the current suction intake gas amount Gc is substantially the same as the target value Gct of the suction intake gas amount, that is, when the internal combustion engine is engaged in steady operation, the routine proceeds to step S15. At step S15, the steady state target value SRn of the swirl ratio calculated at step S13 is set as the final target value of the swirl ratio SRt, and the control routine is ended. The swirl control valve 95 is controlled so that the swirl ratio of the intake gas supplied into a combustion chamber 15 becomes the final target value of the swirl ratio SRt.

On the other hand, if, at step S14, it is judged that the current suction intake gas amount Gc differs from the target value Gct of the suction intake gas amount, that is, if the internal combustion engine is engaged in a transient operation, the routine proceeds to step S16. At step S16, it is judged if the engine load is equal to or greater than a predetermined reference load (above-mentioned medium extent of medium load) Lref. If, at step S16, it is judged that the engine load L is equal to or greater than the reference load Lref, the routine proceeds to step S17.

At step S17, it is judged if the current suction intake gas amount Gc is equal to or greater than the target value Gct of the suction intake gas amount. If, at step S17, it is judged that the current suction intake gas amount Gc is equal to or greater than the target value Gct of the suction intake gas amount, the routine proceeds to step S18. At step S18, the correction amount ΔSR of the swirl ratio is calculated based on the difference between the current suction intake gas amount Gc and the target value Gct of the suction intake gas amount, and engine load. The correction amount ΔSR of the swirl ratio is calculated so as to be larger, as the difference between the current suction intake gas amount Gc and the target value Gct of the suction intake gas amount is larger. In addition, the correction amount ΔSR of the swirl ratio is calculated to be larger as the engine load is higher. Next, at step S19, the value of the steady state target value SRn of the swirl ratio calculated at step S13 plus the correction amount ΔSR calculated at step S18 is set as the final target value of the swirl ratio SRt, then the control routine is ended.

On the other hand, if, at step S17, it is judged that the current suction intake gas amount Gc is smaller than the target value Gct of the suction intake gas amount, the routine proceeds to step S20. At step S20, in the same way as step S18, the correction amount ΔSR of the swirl ratio is calculated. Next, at step S21, the value of the steady state target value SRn of the swirl ratio calculated at step S13 minus the correction amount ΔSR calculated at step S20 is set as the final target value of the swirl ratio SRt, then the control routine is ended.

If, at step S16, it is judged that the engine load L is less than a reference load Lref, the routine proceeds to step S22. At step S22, in the same way as step S17, it is judged if the current suction intake gas amount Gc is equal to or greater than the target value Gct of the suction intake gas amount. If at step S22, it is judged that the current suction intake gas amount Gc is equal to or greater than the target value Gct of the suction intake gas amount, the routine proceeds to step S23. At step S23, the correction amount ΔSR of the swirl ratio is calculated based on the difference between the current suction intake gas amount Gc and the target value Gct of the suction intake gas amount, and the engine load. The correction amount ΔSR of the swirl ratio is calculated so as to be larger, as the difference between the current suction intake gas amount Gc and the target value Gct of the suction intake gas amount is larger. In addition, the correction amount ΔSR of the swirl ratio is calculated so as to be larger, as the engine load is lower. Next, at step S24, the value of the steady state target value SRn of the swirl ratio calculated at step S13 minus the correction amount ΔSR calculated at step S23 is set as the final target value of the swirl ratio SRt, then the control routine is ended.

On the other hand, if, at step S22, it is judged that the current suction intake gas amount Gc is smaller than the target value Gct of the suction intake gas amount, the routine proceeds to step S25. At step S25, in the same way as step S18, the correction amount ΔSR of the swirl ratio is calculated. Next, at step S26, the value of the steady state target value SRn of the swirl ratio calculated at step S13 plus the correction amount ΔSR calculated at step S25 is set as the final target value of the swirl ratio SRt, then the control routine is ended. The swirl control valve 95 is controlled so that the swirl ratio of the intake gas supplied into a combustion chamber 15 to be the final target value of the swirl ratio SRt.

Note that, in the above embodiment, at step S13, the steady state target value SRn of the swirl ratio is calculated based on the engine operating state. However, at step S13, instead of the steady state target value of the swirl ratio, it is also possible to calculate the basic target opening degree of the swirl control valve 95, which corresponds to the steady state target value of the swirl ratio. In this case, at steps S18, S20, S23, and S25, the correction amount of the opening degree of the swirl control valve 95 is calculated, while at steps S19, S21, S24, and S26, a correction amount is added to or subtracted from the basic target opening degree (note that, when using the opening degree of the swirl control valve 95, the addition and subtraction are opposite from steps S19, S21, S24, and S26).

The invention claimed is:

1. An internal combustion engine comprising:
   a swirl control valve able to change a strength of a swirl generated in a combustion chamber;
   a load detection device for detecting an engine load; and
   a control device for controlling the swirl control valve,
      wherein the control device is configured to control the swirl control valve, when an engine load detected by the load detection device is lower than a predetermined load, so that a swirl ratio is higher when a suction intake gas amount is increasing, compared with when the suction intake gas amount is decreasing.

2. The internal combustion engine according to claim 1, wherein, the control device is configured to control the swirl control valve, when the engine load detected by the load detection device is higher than the predetermined load, so that the swirl ratio is lower when the suction intake gas amount is increasing, compared with when the suction intake gas amount is decreasing.

3. The internal combustion engine according to claim 1, wherein
   the control device is configured to set a basic target opening degree of the swirl control valve based on the engine load detected by the load detection device and correct the basic target opening degree when the suction intake gas amount is decreasing, and
   when the basic target opening degree is corrected along with a decrease of the suction intake gas amount, a correction amount in a direction making the swirl ratio increase is increased when the engine load detected by the load detection device is relatively high, compared with when the engine load detected by the load detection device is relatively low.

4. The internal combustion engine according to claim 3, wherein
   the control device is configured to correct the basic target opening degree when the suction intake gas amount is increasing, and
   when the basic target opening degree is corrected along with an increase of the suction intake gas amount, a correction amount in a direction making the swirl ratio increase is decreased when the engine load detected by the load detection device is relatively high, compared with when the engine load detected by the load detection device is relatively low.

5. The internal combustion engine according to claim 2, wherein
the control device is configured to set a basic target opening degree of the swirl control valve based on the engine load detected by the load detection device and correct the basic target opening degree when the suction intake gas amount is decreasing, and
when the basic target opening degree is corrected along with a decrease of the suction intake gas amount, a correction amount in a direction making the swirl ratio increase is increased when the engine load detected by the load detection device is relatively high, compared with when the engine load detected by the load detection device is relatively low.

6. The internal combustion engine according to claim 5, wherein
the control device is configured to correct the basic target opening degree when the suction intake gas amount is increasing, and
when the basic target opening degree is corrected along with an increase of the suction intake gas amount, a correction amount in a direction making the swirl ratio increase is decreased when the engine load detected by the load detection device is relatively high, compared with when the engine load detected by the load detection device is relatively low.

* * * * *